(12) United States Patent
Chang (10) Patent No.: US 7,435,094 B2
(45) Date of Patent: Oct. 14, 2008

(54) BATTERY PLUG STRUCTURE

(75) Inventor: I-Chang Chang, Sijhih (TW)

(73) Assignee: Jye Chuang Electronic Co., Ltd., Sijhih (TW)

( * ) Notice: Subject to any disclaimer, the term of this patent is extended or adjusted under 35 U.S.C. 154(b) by 0 days.

(21) Appl. No.: 11/526,069

(22) Filed: Sep. 25, 2006

(65) Prior Publication Data

US 2008/0076271 A1  Mar. 27, 2008

(51) Int. Cl.
*H01R 11/30* (2006.01)
(52) U.S. Cl. .................... 439/39; 439/502; 320/107; 320/111
(58) Field of Classification Search ............... 439/500, 439/502, 504, 38–40; 320/111, 107; 335/209, 335/229, 219; 361/686
See application file for complete search history.

(56) References Cited

U.S. PATENT DOCUMENTS 4,211,456 A * 7/1980 Sears ........................ 439/39
5,977,747 A * 11/1999 Huang ....................... 320/115
6,626,703 B2 * 9/2003 Hsin ......................... 439/500
7,123,475 B2 * 10/2006 Park ......................... 361/686

* cited by examiner

*Primary Examiner*—Renee S Luebke
*Assistant Examiner*—Harshad C Patel
(74) *Attorney, Agent, or Firm*—Troxell Law Office, PLLC (57) ABSTRACT

The present invention provides an improved structure for a battery plug, wherein plug contacts are plugged into a plug socket to supply electric power, which is conducted to conducting wires. Magnets serve as electrical connecting interfaces when the conducting wires are connected to positive and negative poles and electrical contact points of a battery, Moreover, the magnets are each provided with a strong attraction function which is used to prevent the conducting wires from separating from the positive and negative poles of the battery and producing poor contact with electrical contact points of the battery. Furthermore, the magnetic magnets can be freely moved, and are not affected by shape or size of the battery or different positions and spacings of the contact points, thereby enabling the plug device to achieve multifarious electrical connecting functionality, and provides the plug device with increased originality and practicability.

4 Claims, 9 Drawing Sheets

BATTERY PLUG STRUCTURE

BACKGROUND OF THE INVENTION (a) Field of the Invention

The present invention provides an improved structure for a battery plug, which embodies a variation in one end of a plug device, wherein magnets are used to serve as electrical connecting interfaces when conducting wires are connected to positive and negative poles and electrical contact points of a battery.

(b) Description of the Prior Art

Figure 1:
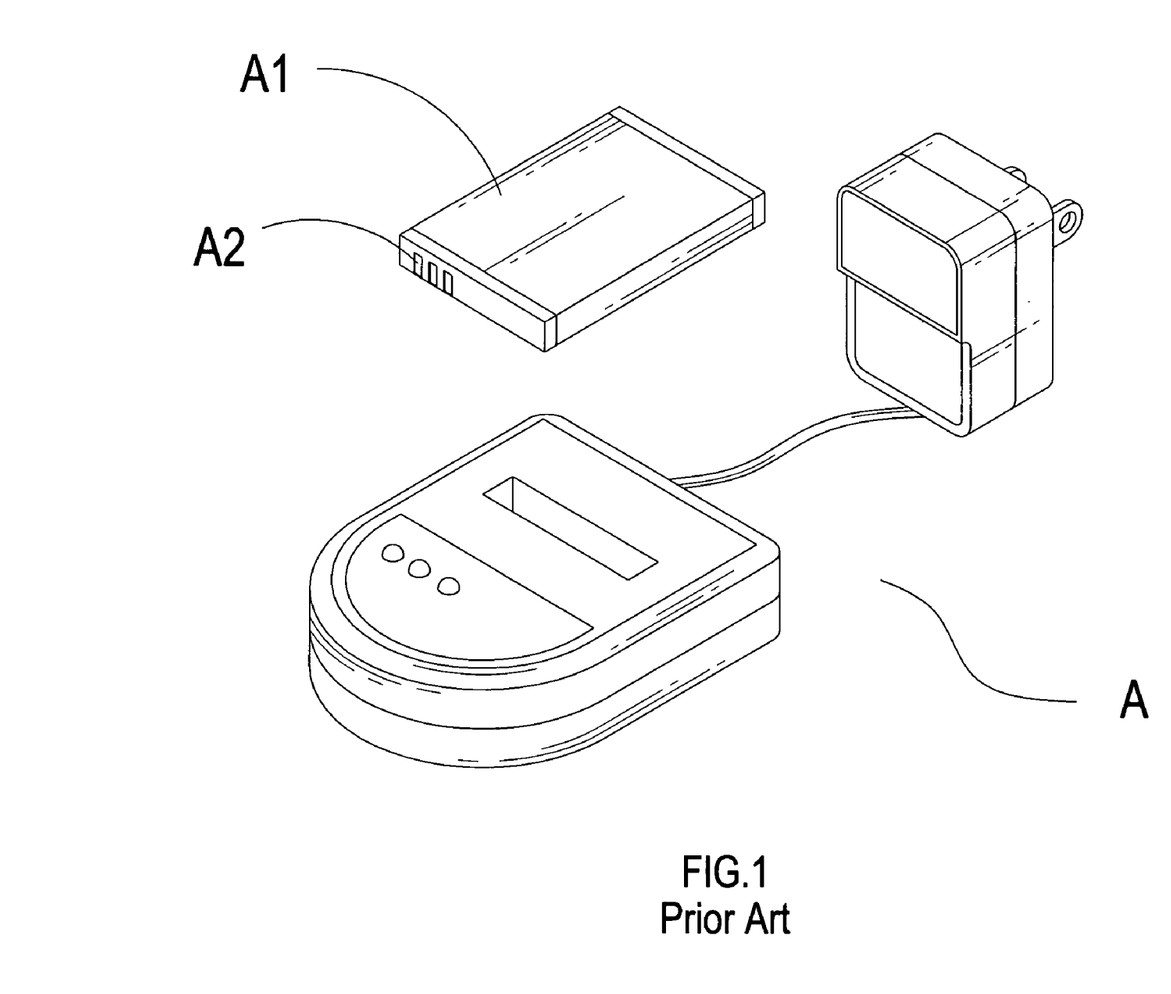
FIG. 1 shows an elevational view of prior art.
Figure 2:
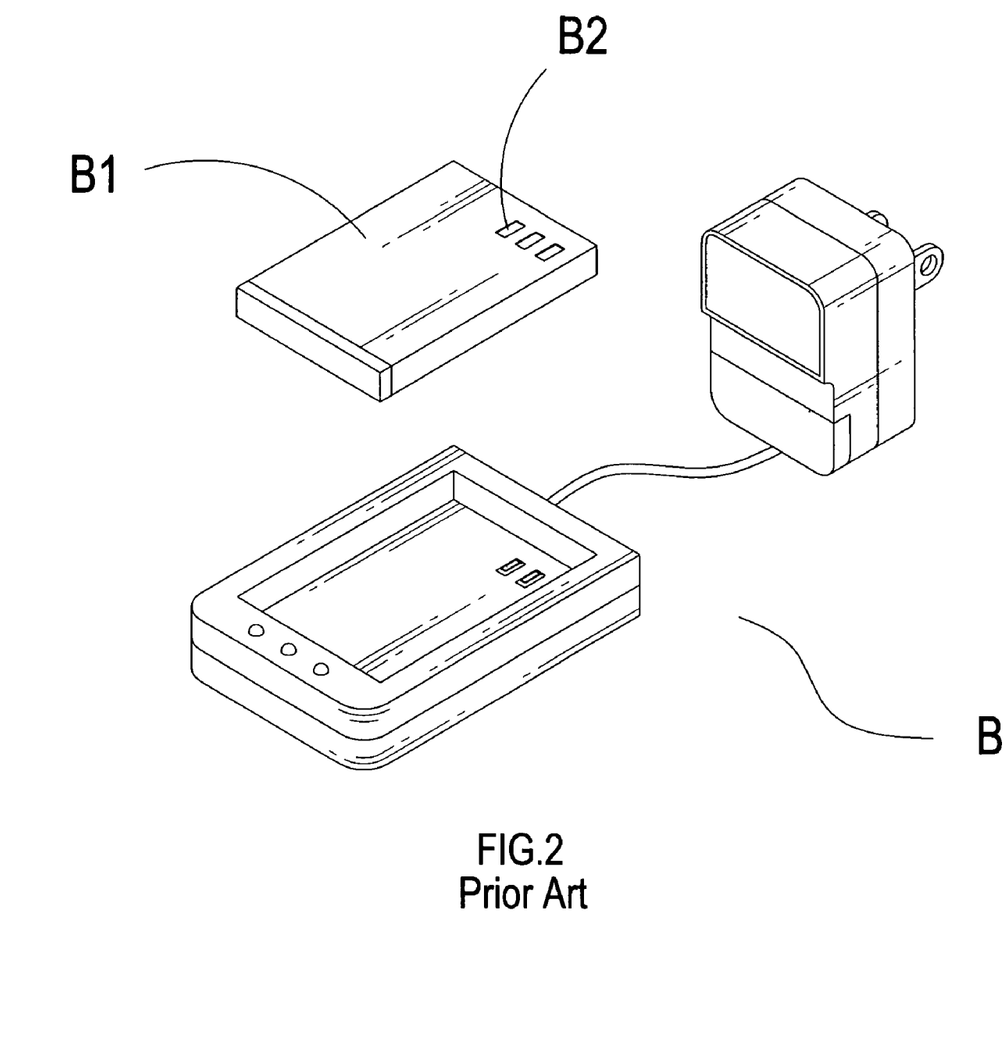
FIG. 2 shows an elevational view of another prior art.

FIGS. 1 and 2 show rechargeable batteries A1 and B1, and chargers A and B of prior art respectively, and when the rechargeable batteries A1, B1 need to be charged, then the chargers A and B provided by the original manufacturers must be used to implement charging. Moreover, because of the different shapes and sizes of batteries on the market, and varied position and spacing of charge contact points A2, B2, thus, other manufacturer brand chargers are unable to substitute the chargers A, B. Hence, if the chargers A, B malfunction or are lost, then a user must request the original manufacturers to repair the chargers A, B or purchase another charger. It may also be the case that the charger models A, B are no longer produced, and thus cannot be purchased, it is bound to happen that the rechargeable batteries A1, B1 and respective chargers become obsolete and unable to be used again, resulting in great inconvenience to users and wastage.

Hence, the inventor of the present invention proposes to resolve and surmount existent technical difficulties to eliminate the aforementioned shortcomings of prior art.

SUMMARY OF THE INVENTION

The present invention provides an improved structure for a battery plug, which embodies a variation in one end of a plug device, wherein magnets are used to serve as electrical connecting interfaces when conducting wires are connected to positive and negative poles and electrical contact points of a battery. Moreover, the magnets are provided with a strong attraction function, which is used to prevent the conducting wires from separating from the positive and negative poles of the battery and producing poor contact with electrical contact points of the battery. Furthermore, the magnetic magnets can be freely moved, and are not affected by shape or size of the battery or different positions and spacings of the contact points, thereby enabling the plug device to achieve multifarious electrical connecting functionality.

To enable a further understanding of said objectives and the technological methods of the invention herein, brief description of the drawings is provided below followed by detailed description of the preferred embodiments.

DETAILED DESCRIPTION OF THE PREFERRED EMBODIMENTS

Figure 3:
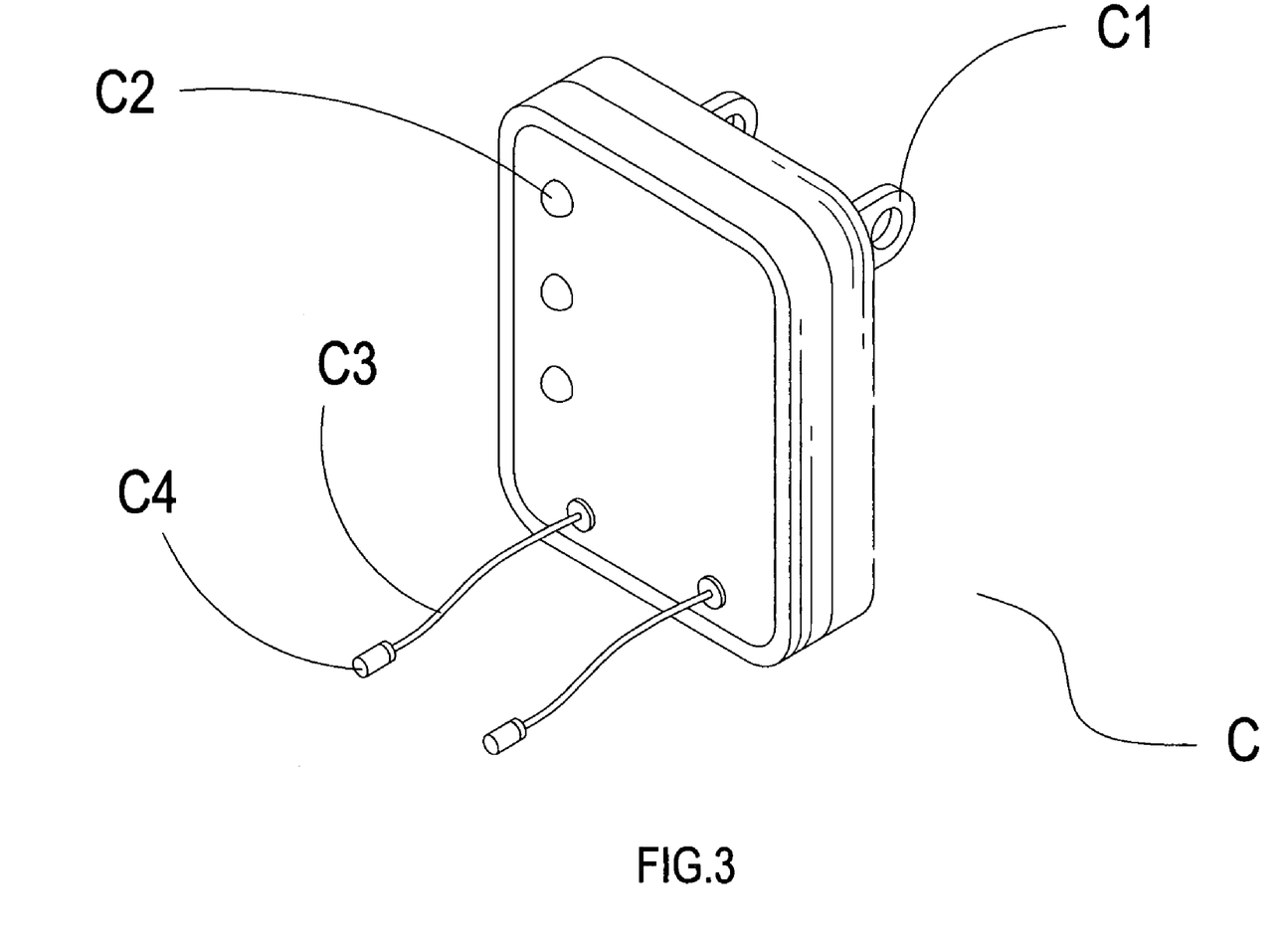
FIG. 3 shows an elevational view according to the present invention.

Referring to FIG. 3, which shows an improved structure of a battery plug of the present invention, wherein a plug device C is structured to comprise plug contacts C1, display devices C2, conducting wires C3 and magnets C4.

The plug contacts C1 are located at one end of the plug device C, and are used to plug into a plug socket, thereby enabling the plug device C to supply electric power and effect charging of a battery. The conducting wires C3 are located at another end of the plug device C, and the magnets C4 are respectively connected to the conducting wires C3, thereby enabling electric power to be conducted to the magnets C4 through the conducting wires C3. The magnets C4 are each provided with a strong attraction function which enables connecting to positive and negative poles of any general rechargeable battery. Moreover, shape or size of the battery does not affect charging thereof, even different positions and spacing of contact points on the battery can be accommodated to implement charging by means of the magnets C4 being able to be freely magnetically attached to the battery according to the user. During the course of charging, the display devices C2 display the different states of the battery, including charging, discharging and saturation, thereby providing the plug device C with increased advancement and practicability.

Figure 4:
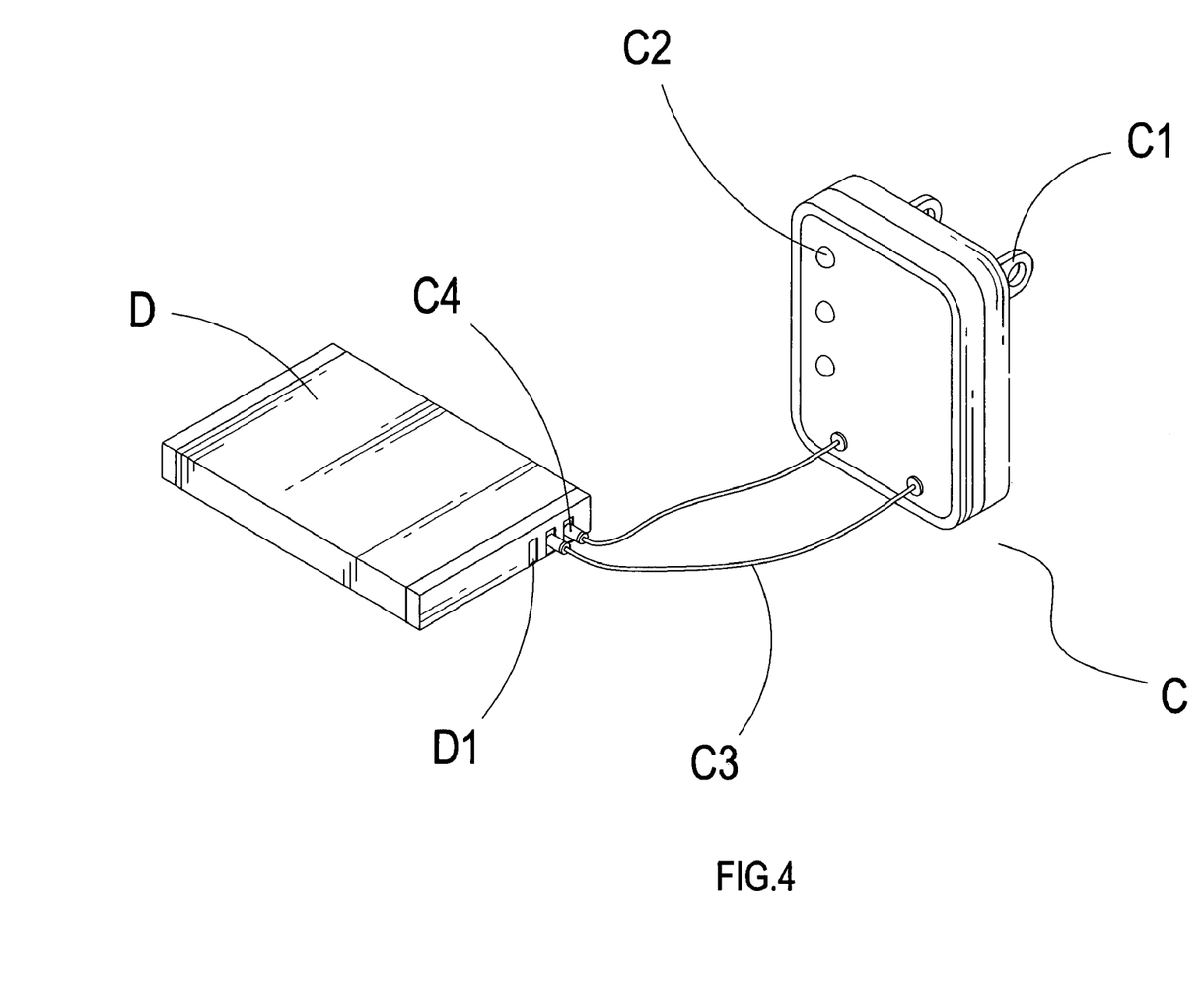
FIG. 4 shows an elevational view of a first embodiment according to the present invention.
Figure 5:
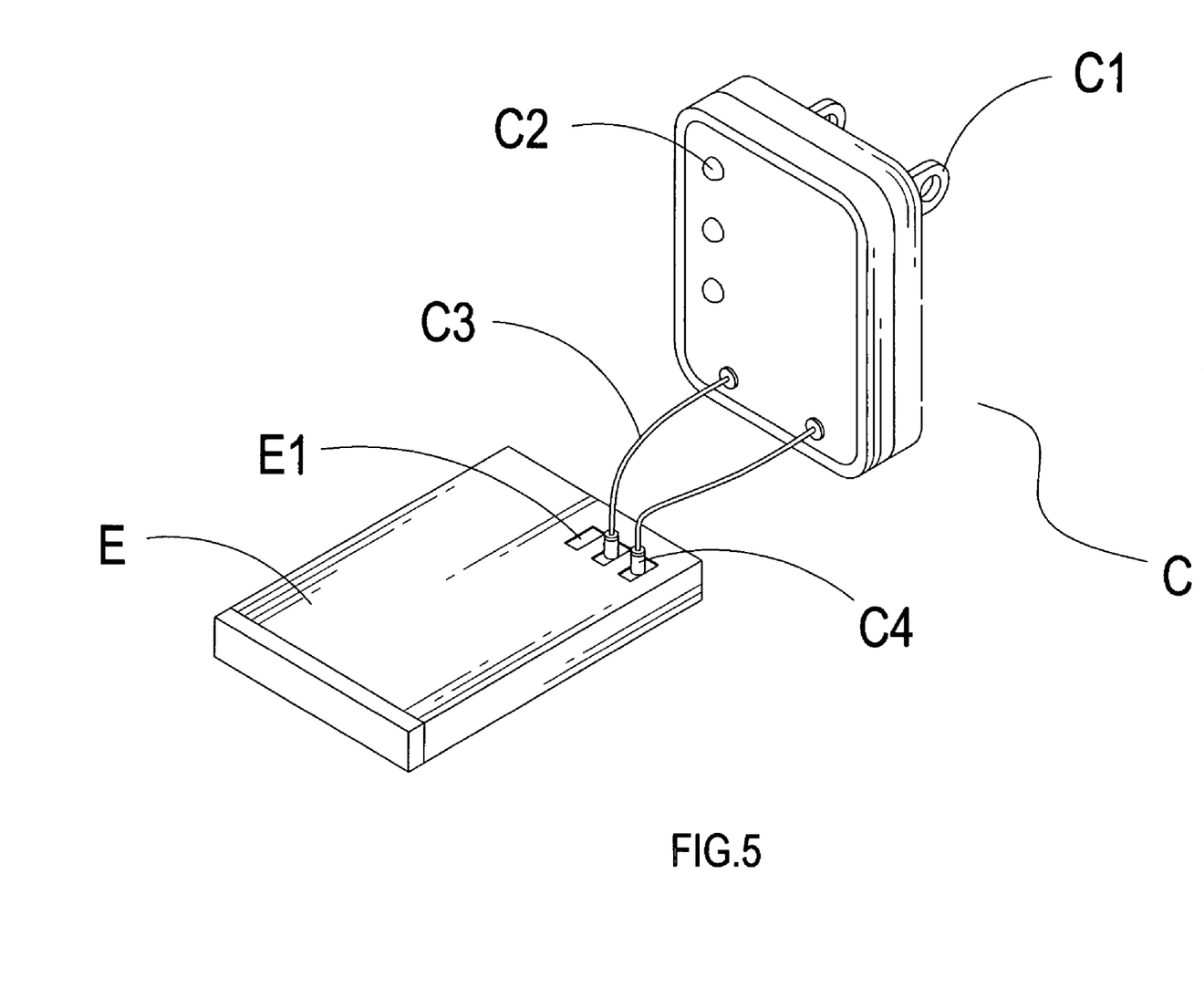
FIG. 5 shows an elevational view of a second embodiment according to the present invention.

Referring to FIGS. 4 and 5, which show embodiments of the present invention, wherein the plug contacts C1 located on the plug device C can be plugged into a plug socket, thereby enabling the plug device C to supply electric power that is conducted to the conducting wires C3. The magnets C4 connected to the conducting wires C3 are provided with a strong attraction and conducting function which enables them to be respectively disposed on contact points D1 of a rechargeable battery D, or respectively disposed on contact points E1 of a rechargeable battery E. Moreover, during the course of charging, the display devices C2 flash various light signals according to different states of the plug device C, including charging, discharging and saturation.

Figure 6:
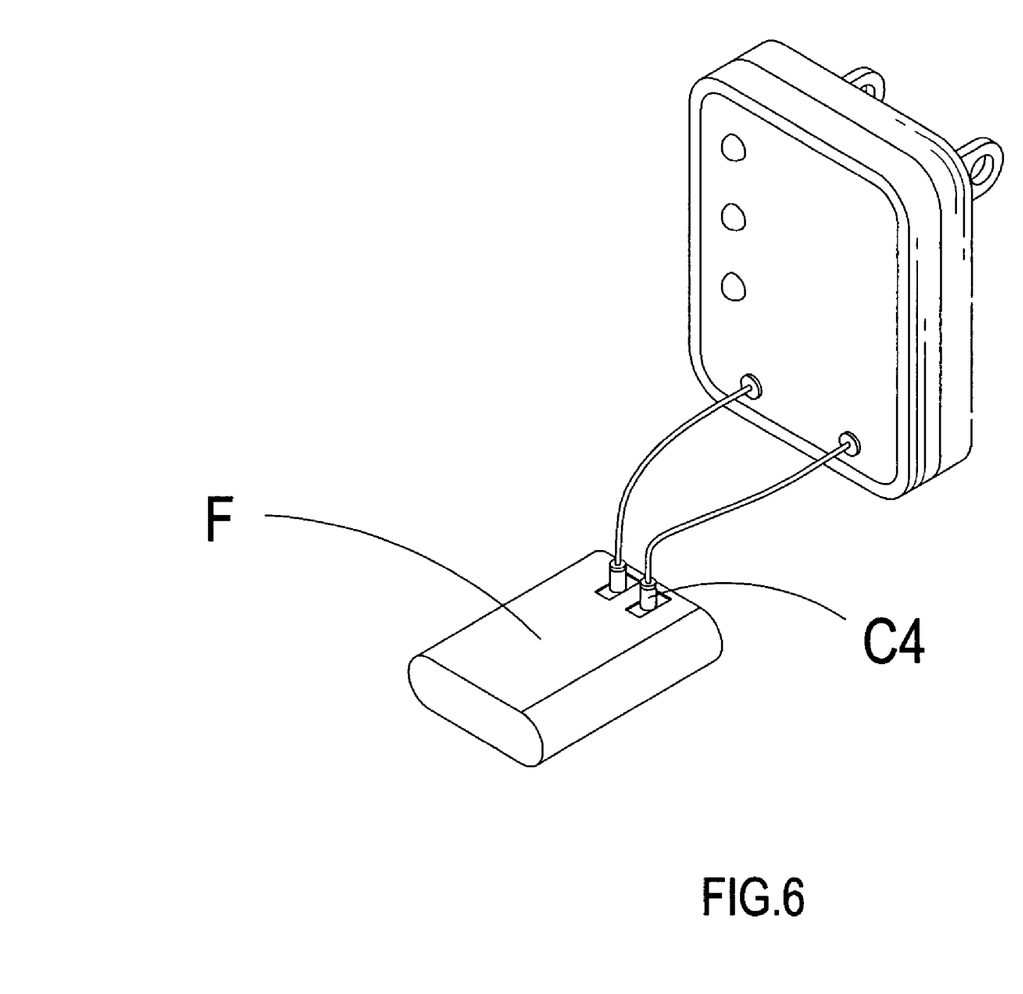
FIG. 6 shows an elevational view of a third embodiment according to the present invention.
Figure 7:
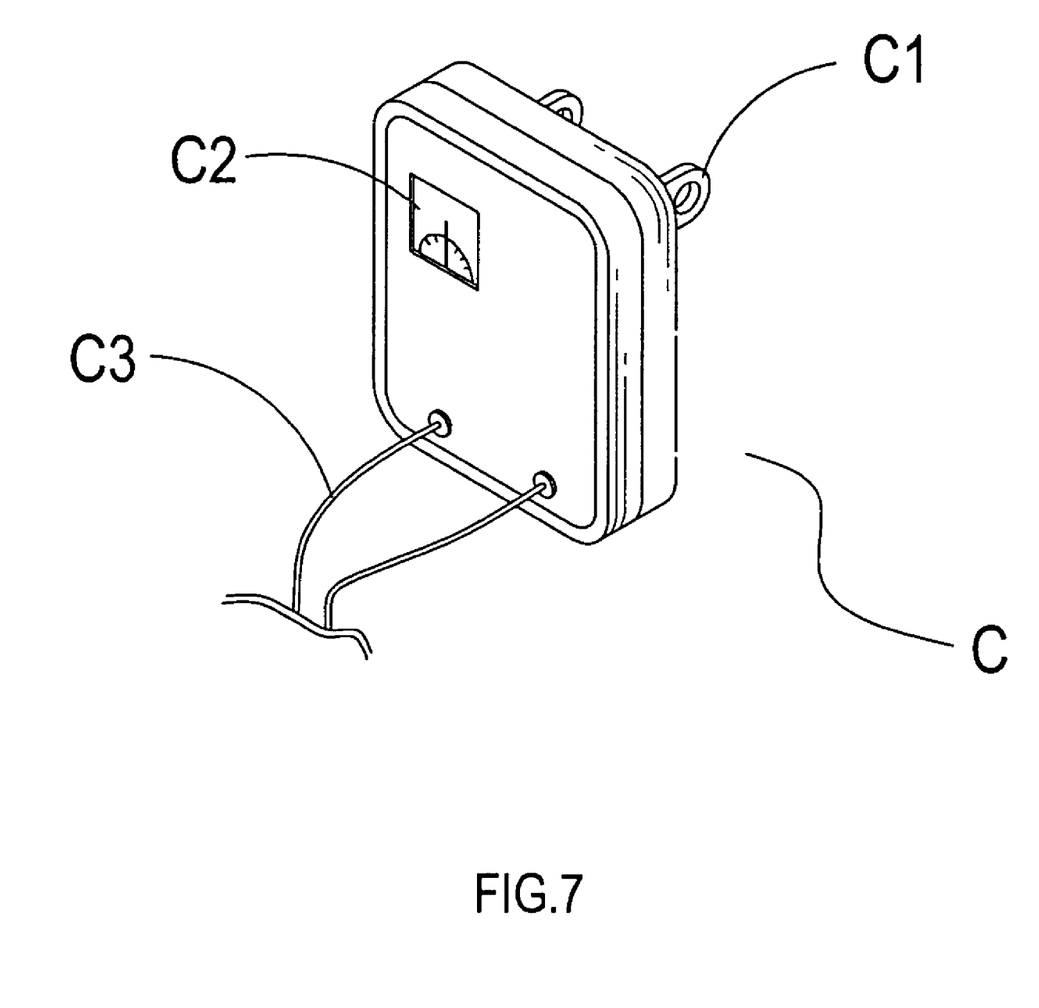
FIG. 7 shows an elevational view of a fourth embodiment according to the present invention.
Figure 8:
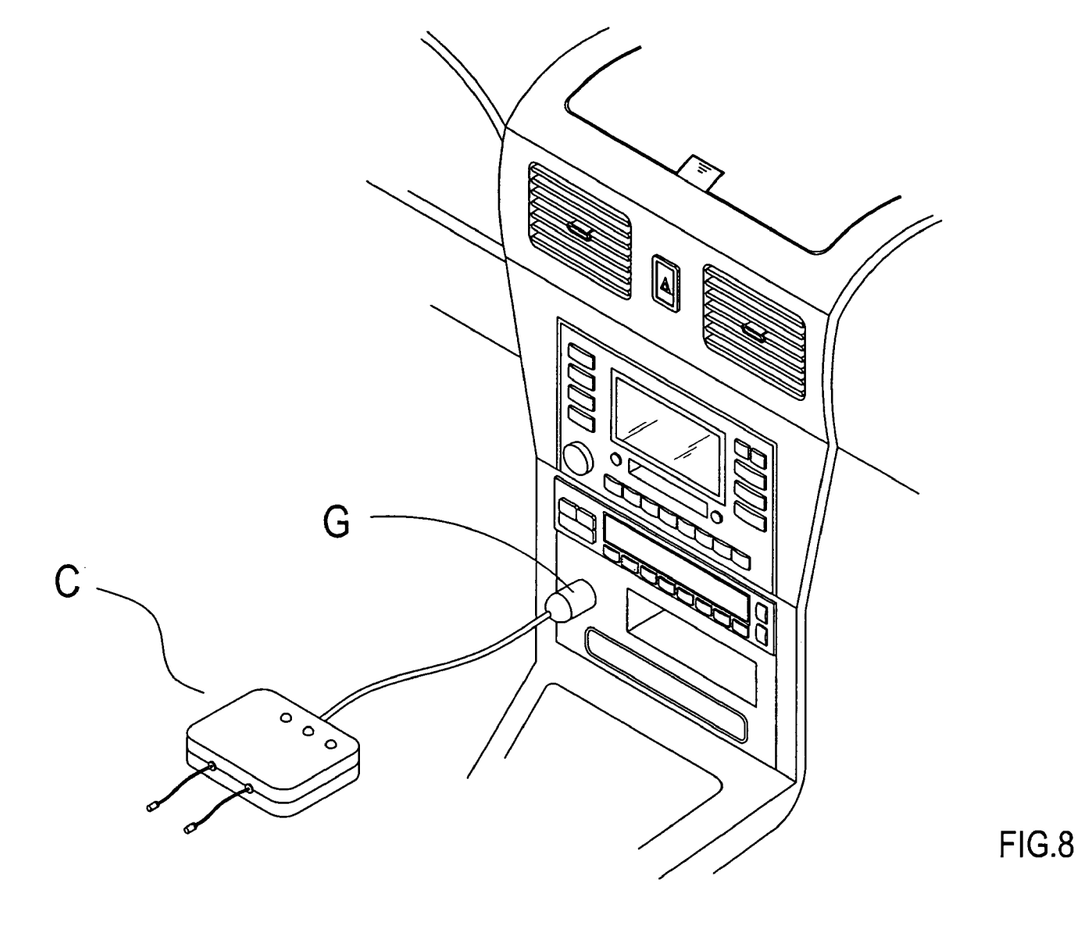
FIG. 8 shows an elevational view of a fifth embodiment according to The present invention.
Figure 9:
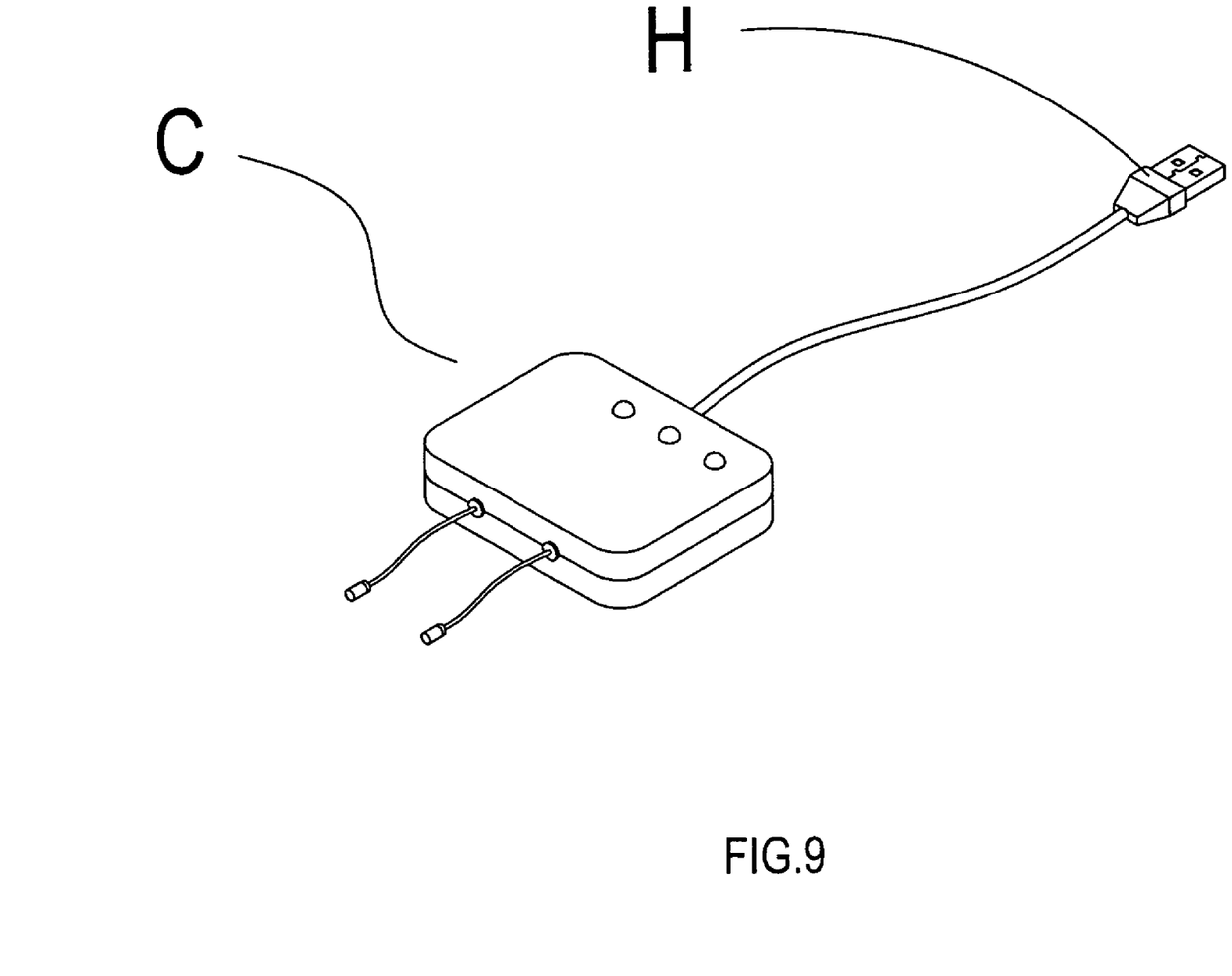
FIG. 9 shows an elevational view of a sixth embodiment according to the present invention.

Referring to FIG. 6, wherein the strong magnetism of the magnets C4 is used to firmly attach to positive and negative poles of a rechargeable battery F, thereby enabling charging of the general rechargeable battery F. Moreover, the magnets C4 can be freely attached to the desired rechargeable battery F of various shapes according to the user.

Referring to FIGS. 4, 5, 7, 8 and 9, wherein the original plug contacts C1 (see FIG. 3) are replaced with a car charger plug G. The car charger plug G can be plugged into a car power socket, thereby supplying power to the plug device C for use thereof, and enabling a user to prepare for possible need. The plug C1 can be replaced with a USB plug H and related power sockets, wherein the magnets C4 attached to contact points D1, E1 as charge devices, discharge devices and devices to measure voltage, current, internal resistance or related properties of the battery. The plug devices are LEDs (light-emitting diodes), LCDs (liquid crystal displays), light bulbs, speakers, voltmeters, ammeters, impedance meters, image devices and related devices.

In order to better explicitly disclose advancement and practicability of the present invention, a comparison with prior art is described hereinafter:

Shortcomings of Prior Art

1. Limited to use with brand and model of the manufacture's rechargeable batteries, thus prohibiting use of an all-purpose charger.

2. Requires additional purchase if lost.

3. Fatigue results in the elasticity of elastic contact points after use of the rechargeable battery and charger for a long period of time, easily causing poor electrical contact.

Advantages of the Present Invention

1. Can be freely attached to contact points of all types of rechargeable batteries, and will not easily come apart or produce poor electrical contact.

2. Is not restricted to size of battery or position of the contact points, and allows all types of rechargeable batteries to commonly use one charger or tester.

3. If jolted, the magnets C4 are immediately attracted and reattached to the contact points of the battery, thereby providing good contact ability.

4. Saves on user expenditure.

5. Provided with advancement and practicability.

6. Enhances commercial competitiveness.

In conclusion, the present invention in overcoming structural shortcomings of prior art has assuredly achieved effectiveness of anticipated advancement, and, moreover, is easily understood by persons unfamiliar with related art. Furthermore, contents of the present invention have not been publicly disclosed prior to this application, and practicability and advancement of the present invention clearly comply with essential elements as required for a new patent application. Accordingly, a new patent application is proposed herein.

It is of course to be understood that the embodiments described herein are merely illustrative of the principles of the invention and that a wide variety of modifications thereto may be effected by persons skilled in the art without departing from the spirit and scope of the invention as set forth in the following claims.

What is claimed is:

1. A battery plug structure, including a plug device comprising:
    conducting wires comprising a positive wire connected to a positive pole and a negative wire connected to a negative pole, the positive pole and negative pole both being electrical contact points of a battery; and
    magnets located at one end of each of the conducting wires as electrical connecting interfaces, the magnets attracting the electrical contact points to prevent the conducting wires from separating from the positive and negative poles of the battery,
    wherein the magnets are freely movable and connection to the electrical contact points is not prevented by battery size or shape arrangement.

2. The battery plug structure according to claim 1, wherein the magnets connected to battery contact points serve as connecting elements to charge devices, discharge devices, or devices to measure voltage, current, or internal resistance of the battery.

3. The battery plug structure according to claim 1, wherein the plug device is configured with display devices, and the display devices are LEDs (light-emitting diodes), LCDs (liquid crystal displays), light bulbs, speakers, voltmeters, ammeters, impedance meters, or image devices.

4. The battery plug structure according to claim 1, wherein a number of the conducting wires is more than two.

* * * * *